United States Patent
Fry

(10) Patent No.: US 7,035,313 B2
(45) Date of Patent: Apr. 25, 2006

(54) NARROW BANDWIDTH, HIGH RESOLUTION VIDEO SURVEILLANCE SYSTEM AND FREQUENCY HOPPED, SPREAD SPECTRUM TRANSMISSION METHOD

(76) Inventor: Terry L. Fry, 10010 Junction Dr., Suite 1145, Annapolis Junction, MD (US) 20701

( * ) Notice: Subject to any disclaimer, the term of this patent is extended or adjusted under 35 U.S.C. 154(b) by 584 days.

(21) Appl. No.: 10/261,722

(22) Filed: Sep. 30, 2002

(65) Prior Publication Data

US 2003/0189638 A1    Oct. 9, 2003

Related U.S. Application Data

(60) Provisional application No. 60/370,923, filed on Apr. 9, 2002.

(51) Int. Cl.
   *H04B 1/69*    (2006.01)
(52) U.S. Cl. ...................................................... 375/132
(58) Field of Classification Search ............... 375/132, 375/130, 135, 136, 138; 348/143, 373, 154, 348/159
   See application file for complete search history.

(56) References Cited

U.S. PATENT DOCUMENTS

| | | | | |
|---|---|---|---|---|
| 5,955,989 A | * | 9/1999 | Li | 342/368 |
| 6,567,458 B1 | * | 5/2003 | Kagaya | 375/132 |
| 2003/0025600 A1 | * | 2/2003 | Blanchard | 340/539 |

* cited by examiner

Primary Examiner—Khai Tran
(74) Attorney, Agent, or Firm—Jones,Tullar&Cooper,P.C.

(57) ABSTRACT

A video surveillance system includes a video surveillance camera and a frequency hopping spread spectrum (FHSS) transmitter for efficiently and economically transmitting high resolution video signals from the video signal source in the license-free ISM bands (e.g., at 900 MHz, 2.4 GHz, or 5.2 GHz) to a FHSS receiver adapted to receive and demodulate the FHSS signal and generate a complete, intact composite analog video signal directly therefrom. Complete and intact means that all of the composite analog video signal is transmitted and received, including the original line sync and frame sync signals, without requiring any further processing. The FHSS hop duration (or dwell time) and tuning frequency of each frequency hop are selected to permit sensing and modulation of the complete, intact composite analog video signal directly from the analog video signal source, whereupon that complete, intact composite analog video signal is transmitted, hop by hop, to a FHSS receiver, preferably using only the vestigial side band portion of the complete, intact composite analog video signal, to provide a high-resolution, narrow-bandwidth video surveillance system.

21 Claims, 6 Drawing Sheets

NARROW BANDWIDTH, HIGH RESOLUTION VIDEO SURVEILLANCE SYSTEM AND FREQUENCY HOPPED, SPREAD SPECTRUM TRANSMISSION METHOD

RELATED APPLICATION

The present application claims priority from and is a continuation of provisional application number 60/370,923 which was filed Apr. 9$^{th}$, 2002, the entire disclosure of which is incorporated by herein reference.

BACKGROUND OF THE INVENTION

1. Field of the Invention

The present invention relates to video surveillance, radio transmitters and regulatory schemes for controlling their use, and to methods and apparatus for efficiently and economically transmitting high resolution video signals using a Frequency Hopped, Spread Spectrum (FHSS) radio transmitter.

2. Discussion of the Prior Art

Ensuring security for large facilities can be difficult, since labor costs usually compel choosing fewer security personnel than might otherwise seem ideal. Large facilities now rely on increasingly complex video surveillance systems in efforts to provide greater security everywhere, all the time.

Installation costs become prohibitive, however, since traditional video cameras must be installed with a compliment of wires to carry video signals from the camera to a central monitoring location and those wires must be installed in a manner which meets applicable building and safety codes. In order to avoid high installation costs for wired video surveillance systems, installers have sought video cameras which can be installed with wireless video signal telemetry links; traditionally, such links are either analog or digital radio links.

A number of traditional analog television signal transmission systems have been used with great success around the world. In the United States, the National Television Standards Committee (NTSC) provided a standard video signal format for composite video signal transmission. The NTSC standard provides for a refresh rate of 60 half frames (interlaced) per second, or 30 completed frames per second. Each NTSC frame contains 525 lines which can represent up to 60,000,000 different colors. The NTSC standard is incompatible with most computer video standards which generally use computer specific video signal processing formats, such as the Red-Green-Blue (RGB) video signal processing format. An NTSC compatible signal is an analog video signal which includes horizontal synchronization (sync) and vertical sync timing signals incorporated along with the video information for each frame to be displayed on the viewers screen.

In other parts of the world, other standards have been adopted for analog television or video signal transmission, for example, in Europe, a standard identified by the acronym PAL provides 635 lines per frame at 25 frames per second. Other well known television standards used elsewhere in the world are identified by the following acronyms or terms: PAL-M, SECAM, SECAM-M, D-MAC, PALplus and HiVision. These standards for analog television or video signal transmission are well documented in technical specifications widely circulated among those having skill in the art.

While analog video or television signal transmission is well known for commercial uses and is perfectly suitable for those video surveillance system applications where wires or cables can be used to pass the video data from a camera to a central location, analog video transmission technology is ill suited to use in a video surveillance system having cameras connected via wireless links. The Federal Communications Commission (FCC) requires each television signal transmitter to be licensed, and it would be nearly impossible to acquire the appropriate licenses to permit, for example, a dozen high resolution television cameras to communicate simultaneously with a central monitoring location. This would be analogous to obtaining FCC licenses for every television station in a hypothetical major city in the United States.

FCC Regulators and spectrum resource managers have been confronted with an increasingly crowded electromagnetic spectrum because users of increasingly varied technologies incorporate wireless radio links into devices which were previously tethered by wires for passing video signals, audio signals, data telemetry or the like.

In response, special license-free bands have been designated by spectrum management agencies around the world for users of low power wireless data telemetry radios to operate wireless links. For example, in the United States, the FCC has designated license-free bandwidth segments of the radio frequency spectrum and made them available for industrial, scientific and medical (ISM) uses. In order to minimize problems with electromagnetic compatibility (EMC) between un-licensed radio transmitters and other radio systems, complex and rigorous regulations have been promulgated to control radiation of RF or microwave energy.

To cite a concrete example, referring to the Oct. 1, 1997 edition of Title 47 of the Code of Federal Regulations (47 C.F.R.), U.S. telecommunications regulations, such as 47 C.F.R. §15.245, §15.247 and others, limit maximum peak output power and electric field strength, as measured in units of volts (or millivolts) per meter. Section 15.249 provides that transmission within the ISM bands, 902–928 MHZ, 2400–2483.5 MHZ and 5725–5875 MHZ shall be limited in electric field strength to 50 millivolts per meter at the fundamental frequency, and at 24.0–24.25 GHz shall be limited to 250 millivolts per meter at the fundamental frequency. There are also strict bandwidth limitations imposed on unlicenced users of the defined channels included in this spectrum.

Distribution of video information as part of a surveillance network environment presents certain challenges for the network designer. For example, with the increasing popularity of multimedia applications, modern computer equipment standards increasingly require digitally encoded visual data. Digital images are, by nature of their graphical content, relatively more complex than other signal types such as digital audio and so require significant bandwidth within the communication channels to transport the complex information embodying the images. Accordingly, to transport such information efficiently, digital imaging applications often rely on the use of data compression techniques to reduce the amount of information to be transmitted within the network to manageable levels.

In light of the above, it is not surprising that image data compression often involves reducing the amount of data required to represent a digital image. One common basis of the reduction process is the removal of "redundant" data. In addition, inherent non-linearities in human visual perception can be leveraged to reduce the amount of data to be displayed in succeeding frames of a motion video. Accordingly, existing compression schemes exploit correlation in both space and time for video signals. Spatial compression is known as intra-frame compression, while temporal compression is known as inter-frame compression. Video surveillance systems using these compression technologies are expensive to manufacture and present problems with image quality and image transit time.

Generally, methods that achieve high compression ratios (e.g., over 50:1) are lossy, in that the data that is reconstructed from a compressed image is not identical to the original. The "losses" experienced in the compression process are manifested as distortions in the reconstructed images. While lossless compression methods do exist, their compression ratios are far lower. For most commercial, industrial and consumer applications, lossy methods are preferred because they save on required storage space and communication channel bandwidth.

Various techniques have been adopted as industry standards for motion image compression, including Recommendation H.261 of the Consultative Committee on International Telephony and Telegraphy (CCITT) for video conferencing, and schemes proposed by the Moving Pictures Expert Group (MPEG) for full-motion compression for digital storage medium. While such video compression methods can compress data at high ratios with acceptable quality in the decompressed images, they do not necessarily provide high data compression ratios for use in limited bandwidth environments such as would be needed for use in the ISM bands. Further, these prior compression processes do not include means for correcting distortions that may be present in earlier-transmitted frames. For example, in those prior video compression schemes that attempt to improve compression efficiency by reducing inter-frame redundancy with the use of "motion estimation" and/or "motion prediction", earlier-transmitted frames are updated by compressing and transmitting the difference between a current frame and a preceding frame. In this manner, the compression process is made more efficient, as subsequent frames do not need to be compressed in their entirety if the extent of the changes between frames is limited. Although these schemes tend to conserve bandwidth, it is likely that distortions will be present in the earlier-transmitted frames, and those distortions are necessarily carried through to subsequent frames. With each new frame, additional compression distortions are introduced into the reconstructed images, and so compression distortions tend to accumulate from frame to frame. Prior art compression schemes do not provide means to reduce or eliminate these distortions, unless the transmitted frame rate is kept high enough to reduce accumulated compression distortion to an acceptable level. Consequently, even using systems incorporating the relatively expensive industry standard data compression methods, too much bandwidth is likely to be needed if acceptable image quality is to be obtained in a wireless video surveillance system.

Others have utilized differing approaches to transmit video images; for example, U.S. Pat. No. 5,859,664, to Dent, teaches use of a transmission method in which analog composite video signals are first stripped of sync signal components which are replaced by frequency hopping codes and then modulated for transmission over a frequency hopped channel; at the receive end, the signal is demodulated and a composite video signal is synthesized in a powerful processor by inserting synthesized video sync and line sync signals. While the Dent system does sidestep the expense and poor quality of video transmission systems using the above described compression technologies; a cumbersome and expensive process of replacing sync signals with other signals and then re-constituting the composite video signal is used in their place. The Dent processor must re-create sync components of the composite video signal before the video image can be displayed on a conventional monitor and so video signal transit time may also be adversely affected unless expensive and very fast processing circuitry is employed.

Video surveillance equipment used in security systems must also be secure and robust. Ideally, any wireless data telemetry system used as part of a security system must be resistant to surreptitious eavesdropping and must be resistant to intentional signal interference or jamming. Traditional AM or FM transmission systems generate signals which are all too easy to locate, intercept and jam.

There is a need, therefore, for an inexpensive, robust, secure wireless video image transmission system and method which will provide high resolution images in a legally compliant segment of bandwidth.

OBJECTS AND SUMMARY OF THE INVENTION

Accordingly, it is a primary object of the present invention to overcome the above mentioned difficulties by providing an inexpensive wireless video image transmission system which will provide images of acceptable quality in one of the FCC's ISM bands.

Another object of the present invention is to provide a method and apparatus for a wireless video image transmission method which will permit transmission of surveillance images of acceptable quality in a legally compliant segment of bandwidth.

Another object of the present invention is to an inexpensive, robust, secure wireless video image transmission system and method which will permit transmission of intact analog video signals over a Frequency Hopping Spread Spectrum (FHSS) in a legally compliant segment of bandwidth.

The aforesaid objects are achieved individually and in combination, and it is not intended that the present invention be construed as requiring two or more of the objects to be combined unless expressly required by the claims attached hereto.

In accordance with the present invention, a video transmission system or apparatus includes a video camera or other video signal source for generating a composite analog video signal and a Frequency Hopped, Spread Spectrum (FHSS) radio transmitter for efficiently and economically transmitting high resolution video signals from the video signal source in the license-free ISM bands at 900 MHz, 2.4 GHz, or 5.2 GHz to a FHSS receiver adapted to receive and demodulate the FHSS signal and generate a complete, intact composite analog video signal directly therefrom. By complete and intact, applicant means that all of the composite analog video signal is transmitted and received, including the original line sync and frame sync signals, without requiring any further processing.

The applicant has discovered that by configuring the FHSS in a surprisingly efficient manner, the duration (or dwell time) and tuning frequency of each frequency hop can be selected to permit sensing and modulation of the complete, intact composite analog video signal directly from the analog video signal source, whereupon that complete, intact composite analog video signal is transmitted, hop by hop, to a FHSS receiver, preferably using only the vestigial side band portion of the complete, intact composite analog video signal, to provide a high-resolution, narrow-bandwidth video surveillance system.

In the preferred embodiment of the method and system of the present invention, the FHSS transmitter, is programmed to select a plurality of hop tuning frequencies from a plurality of pre-assigned ISM band hop frequencies, the transmitter next senses the intact composite analog video signal directly from a NTSC standard analog video signal source, and, upon detection of a frame sync signal, synchronizes the hop timing and begins modulating the intact composite analog video signal directly from the analog video signal source into a first selected hop frequency. At an NTSC interlaced scan rate of one-sixtieth of a second per interlaced frame, the transmitter hop duration is preferably just over one-sixtieth of a second, thereby permitting transmission of a complete interlaced frame scan in each hop.

In response to sensing the FHSS transmitter's transmission on one of the pre-assigned ISM band hop frequencies, FHSS receiver is programmed to demodulate the modulated intact composite analog video signal at the first selected hop frequency to generate a baseband intact composite analog video signal thereby receiving and demodulating a complete interlaced frame scan in each hop. In the preferred embodiment, upon detection of the frame sync signal, the receiver synchronizes the received hop timing and begins demodulating the successive intact composite analog video signal segments modulated at the successive selected hop frequencies.

Preferably, the transmitter and receiver are pre-programmed with pre-assigned ISM band hop frequencies and the process of selecting a plurality of hop tuning frequencies from a plurality of pre-assigned ISM band hop frequencies is completed by developing and storing a hop frequency table in accordance with an algorithm stored in both the transmitter and the receiver. For those installations requiring several video cameras, each transmitter has a different hop table and the receiver is pre-programmed with each transmitter's hop table.

In the preferred embodiment of the video surveillance system of the present invention, the FHSS signals are transmitted from remotely video cameras to a central monitoring location, and the received and demodulated intact composite analog video signal segments are reassembled into a continuous intact NTSC composite analog video signal adapted for display at the monitoring location. Preferably, a controller receives the continuous intact NTSC composite analog video display signal and is programmed to permit the user to select which video camera's signal is to be displayed. The controller is configured to receive a plurality of signals from a plurality of remote video cameras and can be used to route or direct selected camera video signals to selected displays or video recorders or the like.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DESCRIPTION OF THE PREFERRED EMBODIMENT

Figure 1:
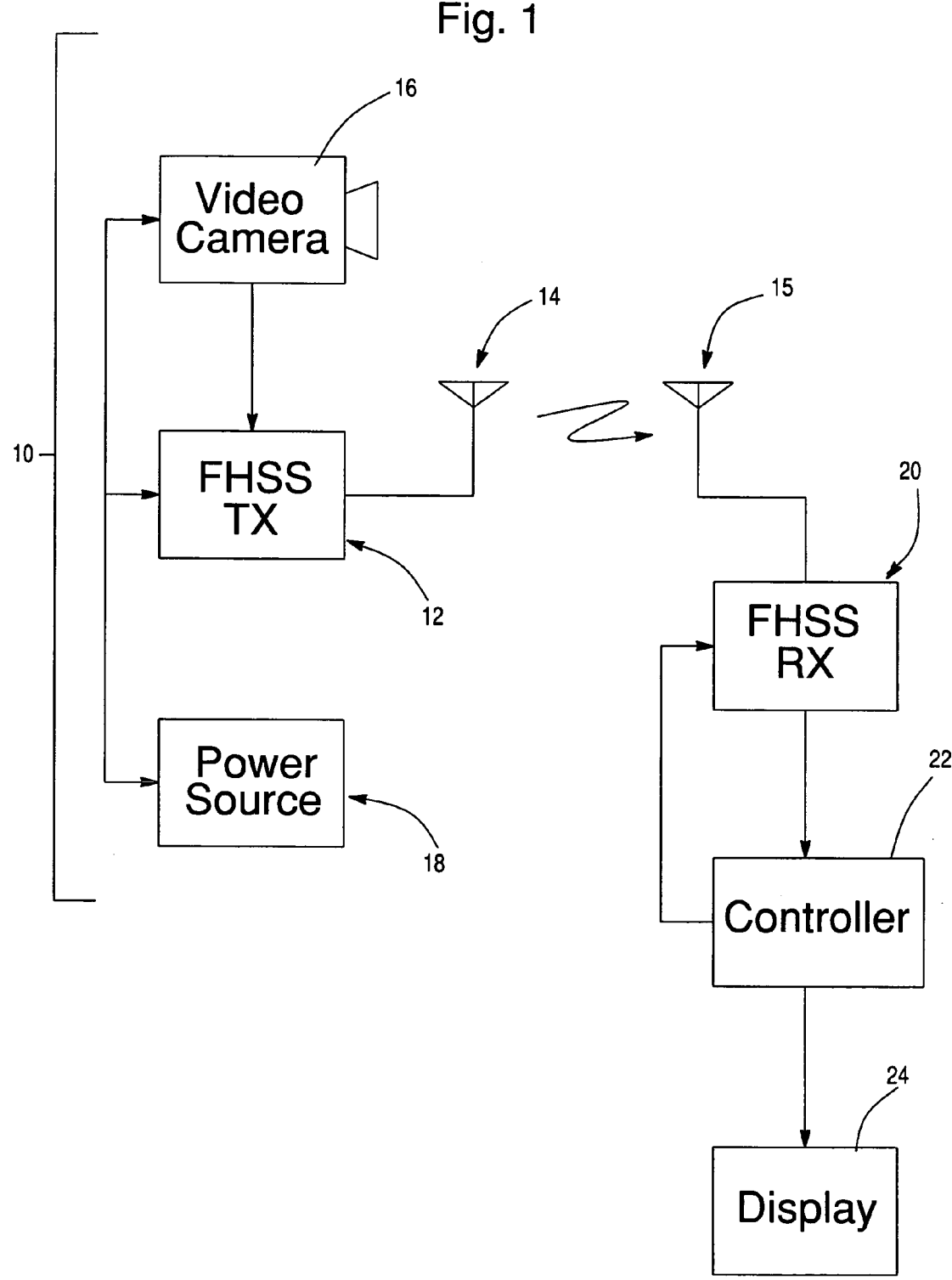
FIG. 1 is a schematic diagram of a video transmission system, in accordance with the present invention.

Turning now to FIG. 17 in accordance with the present invention, a video transmission system or apparatus 10 includes a Frequency Hopped, Spread Spectrum (FHSS) transmitter 12 connectable to an antenna 14.

In a preferred embodiment, camera 16 and transmitter 12 are remotely located for surveillance of a remote area and are co-located with and connected to a power source 18 such as a battery. Optionally, power source 18 includes a solar cell (not shown) for recharging one or more batteries. The signal from transmitter 14 is radiated through free space to a receive antenna 15 which is connected to FHSS receiver 20. At a central location, where multiple camera images can be monitored, a television or video display 24 is configured to display the video image corresponding to the video image signal generated by camera 16. Preferably display 24 is connected through a controller 22 which is adapted to selectively route the image signal either to display 24 or to a video image signal recorder (not shown) connected to controller 22.

Figure 3:
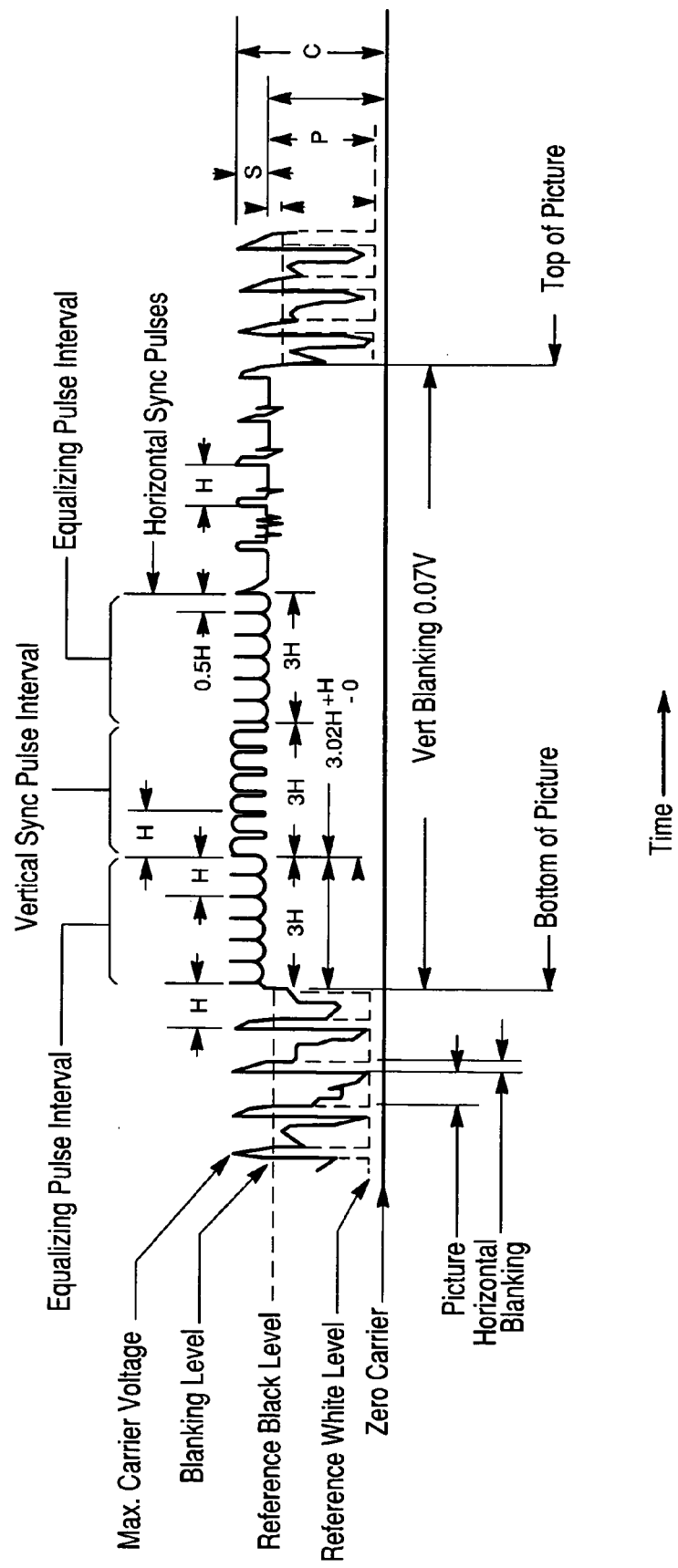
FIG. 3 is a waveform diagram illustrating the time varying characteristics of a first embodiment of the composite video signal, including several horizontal scan intervals and a vertical sync pulse interval, in accordance with the present invention.
Figure 4:
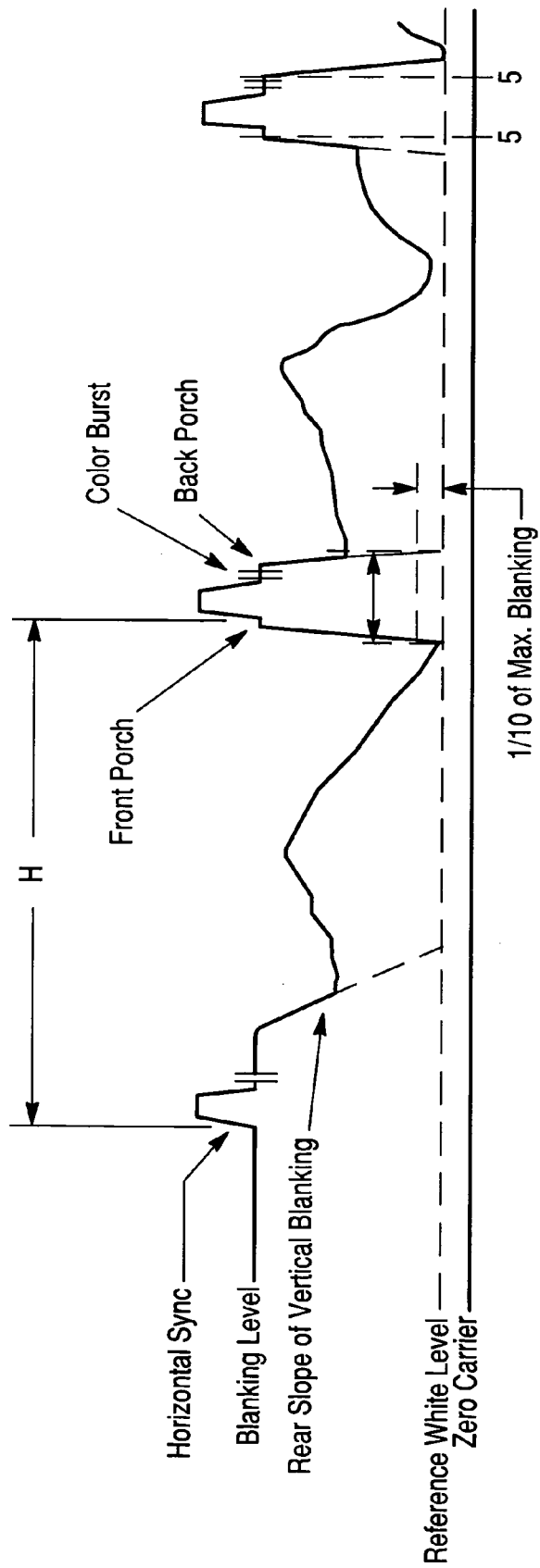
FIG. 4 is a waveform diagram illustrating the time varying characteristics of the first embodiment of the composite video signal, highlighting two horizontal scan intervals, in accordance with the present invention.

Video transmission system or apparatus 10 includes a video camera or other video signal source 16 for generating a composite analog video signal is connected to FHSS radio transmitter 12 for efficiently and economically transmitting high resolution video signals from the video signal source 16 in the license-free ISM bands (e.g., at 900 MHz, 2.4 GHz, or 5.2 GHZ) to FHSS receiver 20 which is adapted to receive and demodulate the FHSS signal and generate a complete, intact composite analog video signal directly therefrom. By complete and intact, applicant means that all of the composite analog video signal spectral content and image signal timing information (e.g., as shown in FIGS. 2, 3 and 4) is transmitted and received, including the original line sync and frame sync signals, without requiring any further processing.

Figure 2:
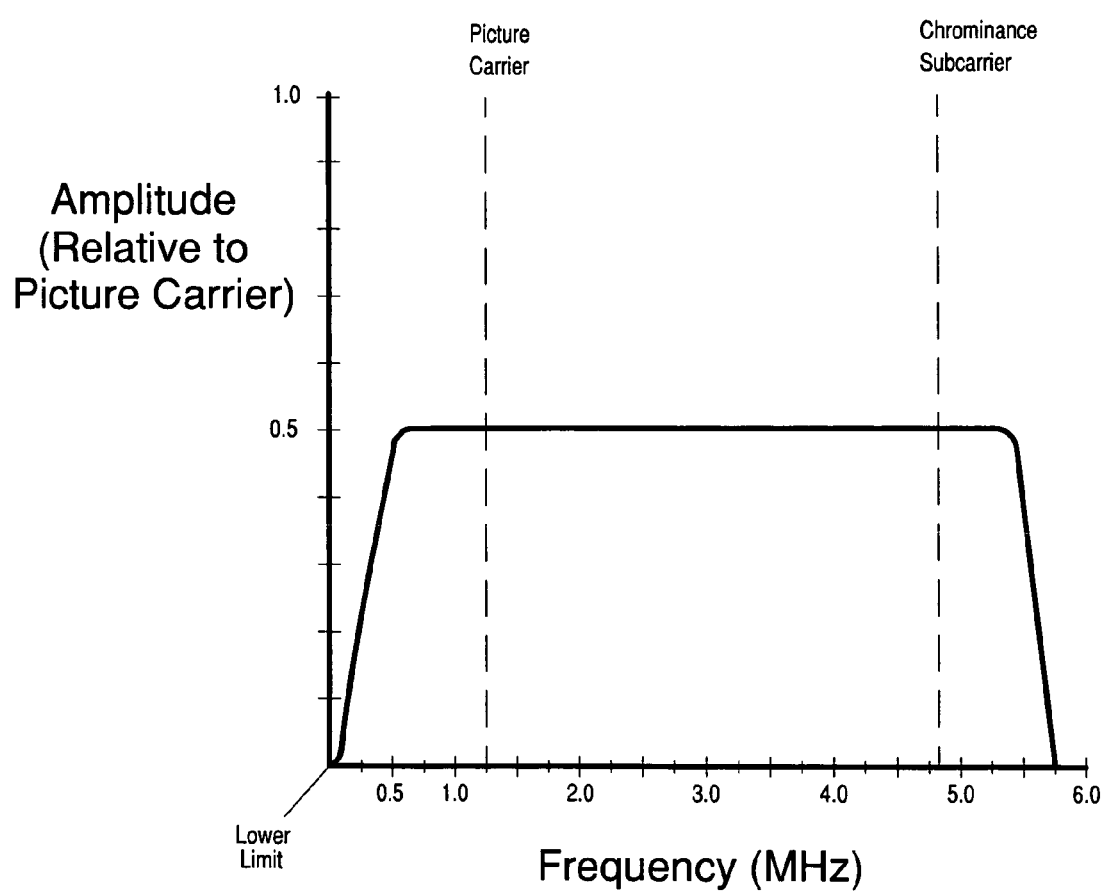
FIG. 2 is a spectrum diagram illustrating the radio frequency amplitude characteristics of a video signal vestigial sideband segment, in accordance with the present invention.
Figure 5:
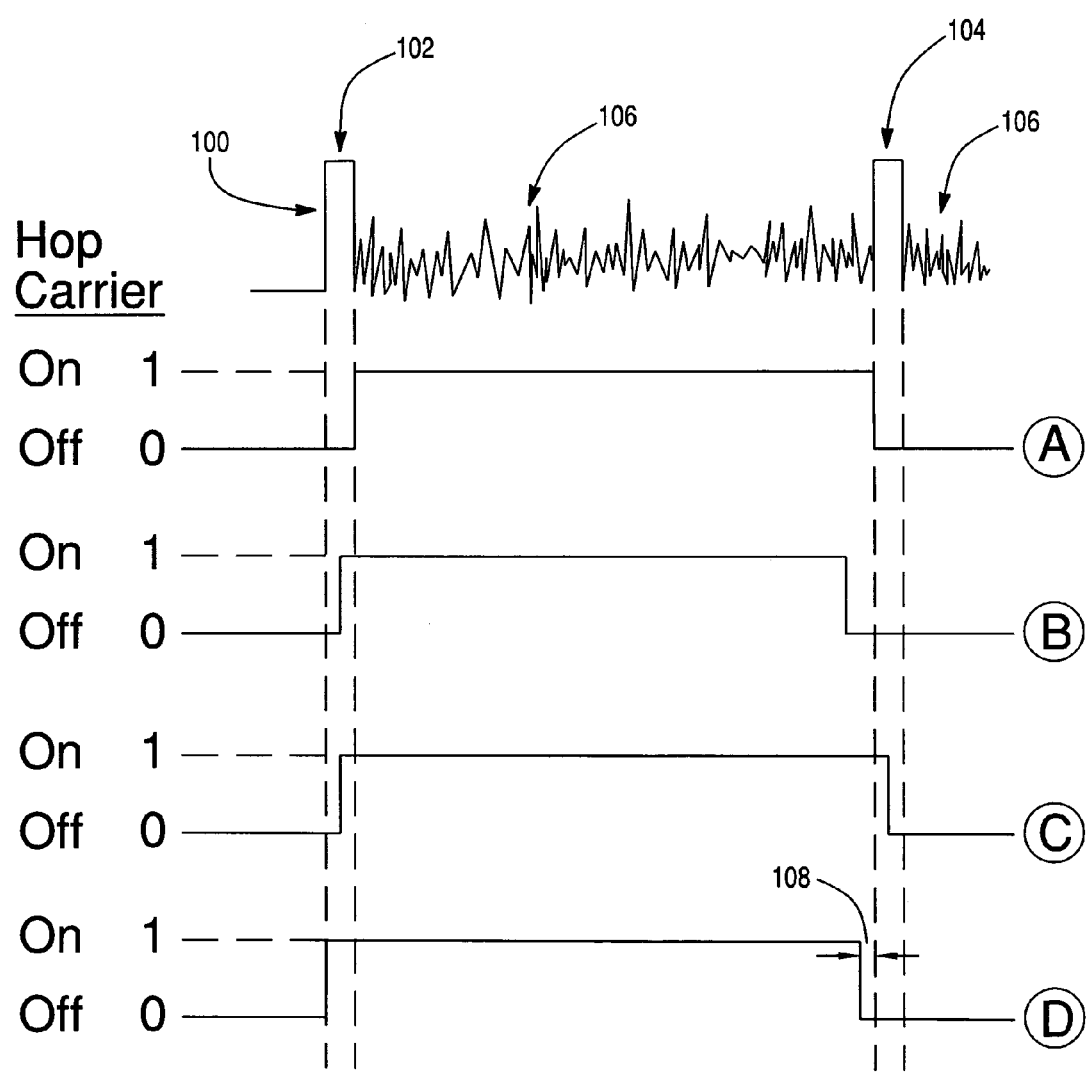
FIG. 5 is a waveform and timing diagram illustrating the time varying characteristics of a composite video signal, including first and second vertical sync pulse interval as well as four traces (A–D) showing alternate embodiments for transmitter hop synchronization and timing, in accordance with the present invention.

In accordance with the method of the present invention, the duration (or dwell time) and tuning frequency of each transmitted frequency hop for FHSS transmitter 12 is selected to permit sensing and modulation of the complete, intact composite analog video signal directly from the analog video signal source 16 onto a hopping carrier, using the timing shown in FIG. 5, whereupon that complete, intact composite analog video signal is transmitted, hop by hop, to FHSS receiver 20, preferably using only the vestigial side band portion of the complete, intact composite analog video signal as shown in FIG. 2.

In the preferred embodiment of the method and system of the present invention, FHSS transmitter 12 is programmed to select a plurality (e.g., 10) of hop tuning frequencies from a plurality of pre-assigned ISM band hop frequencies (e.g., 75).

In the preferred embodiment of the present invention, hop tuning frequencies are stored in a hop table. In alternative embodiments, the hop frequencies are allocated dynamically (preferably in response to a sensed condition or control input) or are calculated by a stored algorithm or formula.

First and second hop tables for Video Transmission System 10 are defined for two embodiments in the 2.4 GHz ISM band, namely, a wide band hopper or a narrow band hopper; both categories were created by the FCC. For the ISM band allocated at 2.4 GHz, the allocated bandwidth is 2400 MHz to 2483.5 MHz.

In a relatively recent development, the FCC permits a wide-band frequency hopper to radiate over five (5) MHz of instantaneous bandwidth at the set-on frequency and requires the number of hop center frequencies to be 15; radiated transmitter power can be no greater than a selected figure (e.g., 100 milliwatts).

In the original ISM band allocated at 2.4 GHz, the FCC permits a narrow-band frequency hopper to radiate over one (1) MHz of instantaneous bandwidth at the set-on frequency and requires the number of hop center frequencies to be 75, while transmitter power can be no greater than a 1 watt.

In the first selected wide-band hop table embodiment, the first hop center frequency is 2408 MHz, and adjacent hop center frequencies are spaced at 5 MHz steps up to 2478 MHz, providing a suitable buffer to both edges of the band and meeting the FCC requirements for the wide-band hop centers. The first hop table embodiment is set forth in Table 1, below.

TABLE 1

Wide band hop table

| | |
|---|---|
| Hop Frequency Number 1 | 2408 MHz |
| Hop Frequency Number 2 | 2413 MHz |
| Hop Frequency Number 3 | 2418 MHz |
| Hop Frequency Number 4 | 2423 MHz |
| Hop Frequency Number 5 | 2428 MHz |
| Hop Frequency Number 6 | 2433 MHz |
| Hop Frequency Number 7 | 2438 MHz |
| Hop Frequency Number 8 | 2443 MHz |
| Hop Frequency Number 9 | 2448 MHz |
| Hop Frequency Number 10 | 2453 MHz |
| Hop Frequency Number 11 | 2458 MHz |
| Hop Frequency Number 12 | 2463 MHz |
| Hop Frequency Number 13 | 2468 MHz |
| Hop Frequency Number 14 | 2473 MHz |
| Hop Frequency Number 15 | 2478 MHz |

Alternatively, in the second selected narrow-band hop table embodiment, using the original narrow band allocation method for the 2.4 GHz band, 75 hop centers are required. FCC requirements dictate that set-on band width (i.e., the band width that generated when dwelling or parking on any one hop center frequency for the hop dwell time) be contained within a one (1) MHz band and that one (1.0) full watt of power can be radiated, at most. The hop centers start at 2403 MHz, and go in 1 MHz even frequency centers up to 2478 MHz. The second hop table embodiment is partially set forth in Table 2, below.

TABLE 2

Narrow band hop table

| | |
|---|---|
| Hop Frequency Number 1 | 2403 MHz |
| Hop Frequency Number 2 | 2404 MHz |

TABLE 2-continued

Narrow band hop table

| | |
|---|---|
| Hop Frequency Number 3 | 2405 MHz |
| ⋮ | ⋮ |
| Hop Frequency Number 73 | 2476 MHz |
| Hop Frequency Number 74 | 2477 MHz |
| Hop Frequency Number 75 | 2478 MHz |

The first and second hop table embodiments illustrate two suitable sets of hop frequencies, although there are small variations around those selected center frequencies that produce the same total required hop count, meaning 15 hops in the case of the wide band channels or 75 hops in the case of narrow band channels.

After the hop tuning frequency selection process is completed, transmitter 12 next senses the intact composite analog video signal directly from camera 16, an NTSC standard analog video signal source, and, upon detection of a frame sync signal, synchronizes the hop timing and begins modulating the intact composite analog video signal directly from the analog video signal source into a first selected hop frequency. At an NTSC interlaced scan rate of one-sixtieth of a second per interlaced frame, the transmitter hop duration is preferably just over one-sixtieth of a second, thereby permitting transmission of a complete interlaced frame scan in each hop, although other hop durations (or dwell times) may be selected, as described in greater detail, below.

In response to sensing the FHSS transmitter's transmission on one of the pre-assigned ISM band hop frequencies, FHSS receiver 20 is programmed to demodulate the modulated intact composite analog video signal at the first selected hop frequency to generate a baseband intact composite analog video signal, thereby receiving and demodulating a complete interlaced frame scan in each hop. In the preferred embodiment, upon detection of the frame sync signal, the receiver synchronizes the received hop timing and begins demodulating the successive intact composite analog video signal segments modulated at the successive selected hop frequencies.

Preferably, the transmitter and receiver are pre-programmed with pre-assigned ISM band hop frequencies and the process of selecting a plurality of hop tuning frequencies from a plurality of pre-assigned ISM band hop frequencies is completed by developing and storing a hop frequency table in accordance with an algorithm stored in both the transmitter and the receiver. For those installations requiring several video cameras, each transmitter has a different hop table and the receiver is pre-programmed with each transmitter's hop table.

In a preferred embodiment of the video surveillance system of the present invention, the FHSS signals are transmitted from remote video cameras to a central monitoring location, and the received and demodulated intact composite analog video signal segments are reassembled into a continuous intact NTSC composite analog video signal adapted for display at the monitoring location. Preferably, a controller receives the continuous intact NTSC composite analog video display signal and is programmed to permit the user to select which video camera's signal is to be displayed. Controller 22 is configured to receive a plurality of signals from a plurality of remote video cameras and can be used to route or direct selected camera video signals to selected displays or video recorders or the like.

As best seen in FIG. 5, five waveforms are shown aligned in time as though represented in five separate traces on an oscilloscope screen, and illustrates the time varying characteristics of a composite video signal 100 showing a first vertical sync pulse interval 102 and a second vertical sync pulse interval 104. The trace appearing between the first and second vertical sync pulse intervals is the analog video signal 106, e.g., as generated by camera 16. The composite waveform 100 shown in the upper trace of FIG. 5 is a generalized composite video signal and, taking the timing requirements of the respective standards into account, could be in any standard analog composite television signal format. For example, waveform 100 could be an NTSC format signal or any of the other well known television standards used elsewhere in the world and identified by the following acronyms or terms: PAL-M, SECAM, SECAM-M, D-MAC, PALplus and HiVision. These standards for analog television or video signal transmission are well documented in technical specifications widely circulated among those having skill in the art, and those technical standards are hereby incorporated herein by reference.

Analog composite video waveform 100 is shown as a top trace in time alignment with four other traces A, B, C and D showing four embodiments for transmitter hop timing, in accordance with the present invention.

Referring to FIG. 5, transmitter 12 generates a hop carrier that is preferably synchronized to the NTSC video signal 100 and is "on" (i.e., "1" or transmitting) when NTSC vertical sync intervals 102 occur and remains on for substantially the entire video signal period 106. FIG. 5 illustrates four traces, A, B, C and D, each illustrating choices for timing or synchronizing the hop carrier "on" interval in relation to the vertical sync pulse interval 102 and the video signal period 106. The left hand column in FIG. 5 indicates "Hop Carrier On", as the figure of merit (meaning the "1" level shown for traces A, B, C & D is "Hop Carrier On" and the "0" level is "Hop Carrier Off". Preferably, at least some of every vertical sync interval (e.g., 102 and 104) will be transmitted during a hop carrier "on" interval, as illustrated in trace C.

Optionally, the time interval shown by trace C may be even more inclusive, meaning that if trace C is drawn symmetrically (i.e., the rising and falling edges of the transmitter form as shown in Figure C each equally split the vertical sync intervals), an even greater percentage of the vertical sync intervals 102, 104 are included within the hop (than the roughly 50% indicated by the rising and falling edge placements for trace C). Since there is a fixed period between vertical sync intervals, a greater transmitter dwell time allows less time to do the actual frequency change or hopping between dwell times. Part of the technical challenge is to make the frequency change or hop expend as little total working power as possible, and so, referring to trace C, if the system hopped once per vertical re-trace, the fastest possible hop is realized. A slower hop rate is also possible.

For those embodiments where a single NTSC video frame retrace is transmitted per hop, one complete vertical sync interval is preferably included and transmitted to receiver 20, and the synchronization method of the preferred embodiment resembles Trace D of FIG. 5; preferably, all of vertical sync interval 102 is transmitted as part of the hop. Preferably, the "hop carrier off" time or dead time 108 is a very short interval that immediately precedes the following sync pulse 104.

Alternatively, the transmitter can hop in sub-multiples of the vertical re-trace interval (which is very close but not exactly equal to 60 Hz). As noted above, when hopping at 60 Hz, one complete picture or video frame is transmitted per hop, and the hop time does make a short duration dead zone. Since both vertical and horizontal sync are needed, most of a vertical sync interval is transmitted to receiver 20 intact. Having transmitted a vertical sync interval and knowing transmitter 12 is about to hop, the most needed portion of the vertical sync interval (e.g., 102) is transmitted and then, when dead time is allocated to hopping, the picture interval 106 may be "eaten into" a little bit, for that purpose, rather than sacrificing the sync interval. So, hopping dead time 108 will "eat into" the picture, which means a few horizontal video lines may be sacrificed in the hopping, and then when video is back on, a little bit of the video picture is sacrificed, either in the lead (or top) of the picture or the bottom of the picture. Hopping is completed in that interval and so not much of the vertical sync is sacrificed.

In another embodiment, multiple vertical syncs (e.g., 102, 104 and successive syncs) come and go without hopping, whereby the hop dwell time at a set frequency is of sufficient duration to permit transmitting two, three, four or more video frames without hopping. FCC regulations limit dwell time to a selected duration (e.g., not longer than 400 milliseconds). In the NTSC system of the present embodiment, one sixtieth of a second (i.e., 16.67 milliseconds) is roughly equal to the time required for one vertical re-trace, and transmitter 12 can dwell as long as desired up to 0.4 seconds (i.e., 400 milliseconds) in integer multiples of one sixtieth of a second; for this example, 24 intervals of 16.6667 milliseconds fit within one 0.4 second dwell time. NTSC video standards mandate two interlaced vertical retraces or sweeps per complete video frame, and so 24 intervals of 16.6667 milliseconds correspond to twelve complete NTSC video frames.

Preferably, though, dwell time is no longer than about 100–200 milliseconds or so on a given transmit frequency because multi-path fading typically becomes problematic every $5^{th}$ to $10^{th}$ of a second. In order to keep multi-path from limiting good quality picture delivery, preferably two or three vertical sync intervals are transmitted without hopping (at most), depending on the multipath environment.

Alternatively, if multi-path fading is determined to not be present for the first 200 milliseconds of dwell time, then a preferred hop dwell time limit of 200 milliseconds can be selected, and twelve complete NTSC video frames or 24 retraces will fit within one 200 millisecond dwell time interval (again, using integer multiples of 16.6667 milliseconds for each NTSC retrace interval).

This description for synchronizing to NTSC veritcal sync signals is merely exemplary, in that system 10 provides flexibility in the time format for transmitting a video signal. The signal can be synchronized to and transmitted it in a format compatible with many other signal formats beside the NTSC format; for example, the transmitted signal and hop dwell time can be synchronized to PAL, PAL-M, SECAM, SECAM-M, D-MAC, PALplus and HiVision TV formats, meaning FHSS transmitter 12 maintains the horizontal line rate and the vertical frame rate using the video sync detection and hop synchronization methods described above, but adjusted for those signal formats. For example, the transmitter selected hop frequency dwell time is preferably greater than one-fiftieth of a second for transmission of a complete PAL interlaced frame scan in each hop.

For a self-contained system, any line rate and any vertical sync rate can be used, depending on how many frames per second are to be transmitted and on horizontal resolution needs.

FHSS transmitter 12 can also be synchronized to hop at the horizontal scan rate. For an NTSC video signal, there are 525 horizontal lines in a standard NTSC picture and, at 62 ½ microseconds per line, that gives you a single interlace, a full picture rate, of 32.8 milliseconds or half that for an interlace scan, and each hop can be synchronized to a single horizontal scan or a selected number of horizontal scans.

Oscillators and related transmitter components must be re-tuned and settle between hops and the amount of dead time needed to go from one hop frequency to another hop frequency (and the time needed to lock-in at the receive side) are known as tuning and settling time. There is a large window of variability, but a typical range of tuning and settling times (i.e., wasted time in the hop after having left the last usable frequency but not yet settled on the new usable frequency) varies from about a tenth of a millisecond to as much as a couple of milliseconds.

For a commercially viable product, using presently available technology, tuning and settling time is preferably about half a millisecond, and preferably, that half millisecond of dead time corresponds to interval 108 (shown in trace D of FIG. 5) and re-tuning occurs in synchronization with the end of the video transmission interval 106 just before sync 104, such that the hop includes all of sync 102, and all of that vertical sync 102 is transmitted through the airwaves intact to receiver 20 and ultimately to display 24.

In embodiment of the present invention described above and illustrated in FIG. 1, timing information is generated within the video camera 16 and is transmitted to video receiver 20. A standard television ("TV") has a well known locking circuit that detects the transmitted horizontal and vertical sync times, and the locking circuit slaves itself to the received signal for sync timing. The sync transmission method of the present invention described above preserves that sync timing. FHSS Transmitter 12 does blank a small segment of the transmitted signal in an intelligent way so as to not excessively damage the needed sync information coming from camera 16, but does not modify that timing information in any other way, and so it is transmitted intact. FHSS Transmitter 12 simply allows FHSS receiver 20 to view the camera timing, but in no way compresses, extends, relocates or alters the timing that camera 16 transmitted and the timing that receiver 20 is asked to deal with, is exactly the camera timing delayed only by the transmission time. The camera generated signal is not regenerated or adjusted in any way, it is simply reproduced intact by FHSS transmitter 12.

Figure 6:
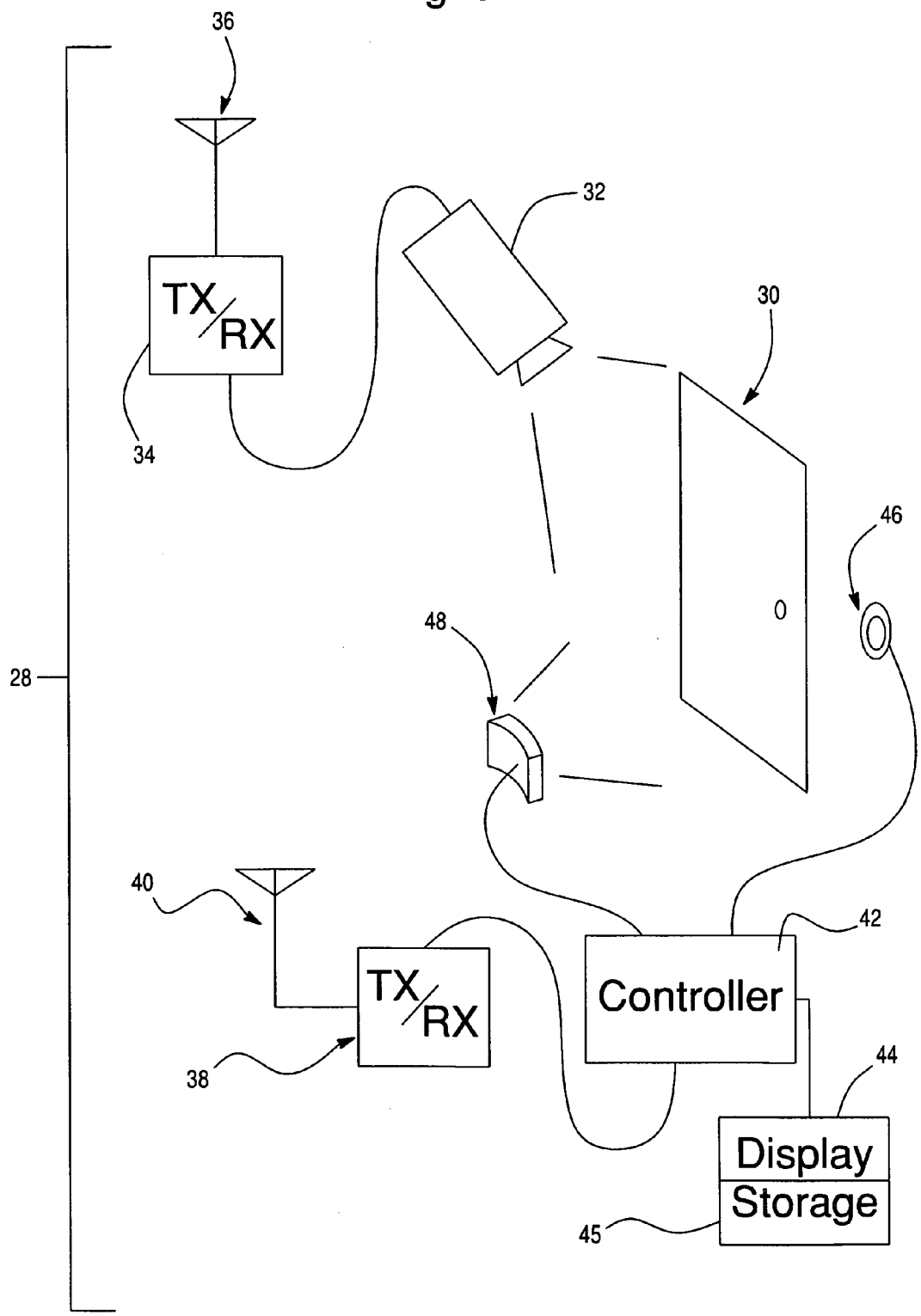
FIG. 6 is a schematic diagram of an actuator-triggered, dual transceiver video transmission system, in accordance with the present invention.

System 10 is readily adapted to perform other functions. Referring now to FIG. 6, system 28 one or more remotely mounted FHSS transceiver 34 communicated via radio link to a central FHSS transceiver 38 via their respective antennae 36, 40, and a video camera 32 preferably generating a standard TV format signal (e.g., NTSC, PAL, PAL-M, SECAM, SECAM-M, D-MAC, PALplus or HiVision) is connected to transceiver 34 and monitors a monitored area, such as an area including a door 30. Central transceiver 38 is connected to a controller 42 which is connected to or responsive to a door bell or switch actuator 46 and, optionally, a motion sensor actuator 48, each of which generate actuator trigger signals in response to detected conditions. Images viewed by camera 32 are transmitted through remote transceiver 34 to central transceiver 38, and are preferably routed through controller 42 to a display component 44 or storage component 45. When a detected condition (e.g., movement-in front of Motion detector 48) occurs, a trigger signal passes from motion detector 48 to controller 48 which is programmed to respond to that trigger signal by passing a trigger signal through the transceivers 38, 34 and to camera 32.

For "video on demand" video for the front door is not transmitted until, for example, adjacent doorbell actuator 46 rings and camera 32 is triggered. Optionally, system 28 is controlled by software in controller 42 to provide one still frame image of whatever is in front of door 30 in response to sensing that door bell 46 has been actuated, and in that case, the radio system comprised of transceivers 34 and 38 becomes an interrogator for camera 32 and triggers or actually causes the camera's sync timing to begin and then camera 32 transmits back the one or more (e.g., a burst of five) still frames. Alternatively, that trigger signal can be used to turn-on camera 32 for continuous operation.

The camera is usually the master, from a timing point of view, but, for example, a security system providing video for many cameras, provides much unneeded video. Passive monitoring can be accomplished by providing transmission and storage of data at a reduced frame rate, such as one frame per second or one frame per three seconds. Video records from many cameras can be monitored periodically by security personnel to make sure everything is working. Video records from many cameras kept on file can be reviewed in case something was missed, e.g., three days later, one may go back to a selected camera and notice, for example, a hole in the fence, and wonder "what came through there?" Later review of that camera's stored or archived video data (at the rate of one frame per second or one frame per three seconds) can readily be accessed from a video storage system.

Alternatively, a motion sensor 48 that is independent of the video camera can be aimed at a place of interest viewed by one or more cameras (e.g., 32) and used to generate a trigger signal in response to detecting motion near the cameras. When the motion sensor trigger signal is detected (e.g., in a controller such as controller 42), the frame rate on the cameras that monitor the area covered by the motion sensor can be increased. In this embodiment, the transceivers (e.g. 34) actually control the frame rate of all the cameras, and if a state of low or moderate alert exists, every camera is transmitting at a slow frame rate such as one picture every three seconds. If the system receives a trigger signal (e.g., from a motion detector) indicating a transition to a state of high alert, then any camera in the area the state of high alert, transitions to an elevated frame transmission rate, such as five frames per second, and the camera preferably receives its sync directly from the transceiver which is linked to a control center where the collateral information (e.g., the motion sensor trigger signal), was received, then the system intelligently goes to just the affected area, with just the affected area's camera, and transmits five frames per second until the state of alert changes.

The controller (e.g., controller 42) can either directly supply the sync to those cameras and feed it in a controlled way back to the medium, which wants to receive it at the supplied sync rate, (e.g., due to volume limitations or bandwidth limitations). Alternatively, the camera is set to a different mode of operation and is triggered by a command from the transceiver to change the frame rate, whereupon the camera remains master the timing and generates the timing or sync signals to control frequency hopping, as described above. In this method, the camera is just taking its timing in kind of macro instructions if you will, from the radio, as to what frame rate to generate, but its still generates the frame-to-frame timing.

Alternatively, the transceiver (e.g., 34) can generate the frame-to-frame timing, at least for the vertical sync, saying, in effect "I want a picture now", thereby painting one vertical picture, and waiting until a subsequent trigger to generate another picture at precisely the desired instant.

The systems (10,28) use a high frequency hop to send a non-digitized analog signal. Which, in the exemplary embodiments, happen to be video signals with unique and predictable time characteristics. But one could also transmit a non-video analog signal. For example, one could transmit any sort of narrow band signal, using an operating radio, and use each hop as a sample, just as you would a "sample and hold" sensing system. Thinking in terms of sampling theory, for example, is system FHSS transmitter 12 hops a hundred times a second, theory would indicate the most you can transmit is 50 Hz, but one hop sample is a single point, not a line. What this system transmits is a continuous analog interval or line, and within the draw time the line changes. So transmitter 12 is capable of transmitting a continuous signal that is interrupted at very small points (the hop transition time), but is otherwise a continuous signal. This provides, potentially, a very wide band width (e.g., say 5 meters band width), and the only damage done to the sampled signal with the process to interrupt it periodically for the hop transition time. One could sample or transmit many things that way. In fact, if voice were transmitted with this method and the system were adapted to hop 75 times per second, the primary interference problem would be 75 Hz buzz on the voice, but the 75 Hz buzz is readily removed from the signal with a notch filter. Using the method of the present invention, other continuous wave forms (i.e., that are not digitized, are not quantized and that don't even have the time synchronization of a video signal) can be transmitted. Thus, using the method of the present invention, one may transmit an analog signal with a frequency hopping radio, the analog signal does not necessarily have to have any particular time signature, appropriate signals include voice, a voltage value for transmission to a remote dial indicator, an engine RPM signal or a signal indicating fluid pressure or flow rate.

In an exemplary embodiment, for a signal transmission system in the narrow band hop mode of 2.4 gigs, hopping on 75 Hop centers (as previously described), for a plethora of signals in an environment with 75 different water pipes passing through a water processing facility with 75 stand pipes used for a fire sprinkler distribution head point, pressure must be maintained in 75 different feeds off of a single stand pipe for safety, and the one thing one must know is whether every one of these pipes is pressurized and ready to go, all of the time. Each one of those pressures can be measured and an analog pressure measurement signal can be assigned to a different hop and, one hop at a time, 75 hops a second, once a second, an updated pressure is transmitted for all 75 pipes. With 75 wires carrying analog pressure signals coming into the radio, the system is basically a big analog multiplexer.

This is less expensive than bringing 75 signals into an analog multiplexer, digitizing them all, and then creating and transmitting digital packets to provide periodic updates on all 75 channels over more complicated and expensive digital hardware. The digital signal is more susceptible to noise since, if one or more bits are lost to noise, there is always a probability that something is going to get flipped and if the most significant bit is flipped (any bit is as likely as any other bit to get a noise hit), the data may be radically changed until other samples come by, the alarm condition may be inadvertently created. With an analog signal, however, a noise hit is less damaging, since noise is averaged out nicely anyway, and using an optimum filter for each analog signal, and it can be shown that the probability of an inadvertent threshold or false alarm in the analog system is actually better than for the digital system.

Having described preferred embodiments of a new and improved method and apparatus for transmitting information, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A video surveillance system, comprising:
   (a) a first video surveillance camera adapted to generate a first analog composite video signal including frame synchronization pulses and line synchronization pulses;
   (b) a first frequency-hopped spread spectrum transmitter having a programmable processor, memory, and an input circuit connected to said first video surveillance camera and adapted to sense said first analog composite video signal including said frame synchronization pulses and said line synchronization pulses;
   (c) said first frequency-hopped spread spectrum transmitter being programmed to select a first hop tuning frequency from a plurality of pre-assigned selected frequency band hop frequencies stored in said transmitter memory;
   (d) said first frequency-hopped spread spectrum transmitter having a first tunable oscillator tunable to any of said plurality of pre-assigned selected frequency band frequencies;
   (e) said first frequency-hopped spread spectrum transmitter input circuit being configured to detect said first analog composite video signal frame synchronization pulses,
   (f) said first frequency-hopped spread spectrum transmitter being programmed to synchronize transmitter frequency hop timing in response to detection of said first analog composite video signal frame synchronization pulses and modulate said first analog composite video signal including said first analog composite video signal frame synchronization pulses and said line synchronization pulses onto a carrier at said first selected hop frequency for a selected hop frequency dwell time; and
   (g) a frequency-hopped spread spectrum receiver programmed to demodulate said modulated first analog composite video signal including said frame synchronization pulses and said line synchronization pulses at said first transmitter first selected hop frequency and generate a first baseband composite analog video signal in response thereto.

2. The video surveillance system of claim 1, further comprising:
   (a) a second video surveillance camera adapted to generate a second analog composite video signal including frame synchronization pulses and line synchronization pulses;
   (b) a second frequency-hopped spread spectrum transmitter having a programmable processor, memory, and an input circuit connected to said second video surveillance camera and adapted to sense said second analog composite video signal including said frame synchronization pulses and said line synchronization pulses;
   (c) said second frequency-hopped spread spectrum transmitter being programmed to select a first hop tuning frequency from a plurality of pre-assigned selected frequency band hop frequencies stored in said transmitter memory;

(d) said second frequency-hopped spread spectrum transmitter having a first tunable oscillator tunable to any of said plurality of pre-assigned selected frequency band hop frequencies;

(e) said second frequency-hopped spread spectrum transmitter input circuit being configured to detect said second analog composite video signal frame synchronization pulses;

(f) said second frequency-hopped spread spectrum transmitter being programmed to synchronize transmitter frequency hop timing in response to detection of said second analog composite video signal frame synchronization pulses and modulate said second analog composite video signal including said second analog composite video signal frame synchronization pulses and said line synchronization pulses onto a carrier at said first selected hop frequency; and (g) said frequency-hopped spread spectrum receiver being programmed to demodulate said modulated second analog composite video signal including said frame synchronization pulses and said line synchronization pulses at said second transmitter first selected hop frequency and generate a second baseband composite analog video signal in response thereto.

3. The video surveillance system of claim 1, wherein said pre-assigned selected frequency band hop frequencies are pre-assigned ISM frequency band hop frequencies.

4. The video surveillance system of claim 1, wherein said first analog composite video signal including frame synchronization pulses and line synchronization pulses is an NTSC standard analog composite video signal.

5. The video surveillance system of claim 4, wherein said first transmitter selected hop frequency dwell time is greater than one-sixtieth of a second, thereby permitting transmission of a complete NTSC interlaced frame scan in each hop.

6. The video surveillance system of claim 1, wherein said first analog composite video signal including frame synchronization pulses and line synchronization pulses is a PAL standard analog composite video signal.

7. The video surveillance system of claim 4, wherein said first transmitter selected hop frequency dwell time is greater than one-fiftieth of a second, thereby permitting transmission of a complete PAL interlaced frame scan in each hop.

8. A method for transmitting an analog composite video signal including frame synchronization pulses and line synchronization pulses with frequency-hopping spread spectrum signals, comprising:

(a) selecting a frequency-hopping spread spectrum transmitter first hop tuning frequency from a plurality of pre-assigned selected frequency band hop frequencies stored in a frequency-hopping spread spectrum transmitter memory;

(b) sensing an analog composite video signal including frame synchronization pulses and line synchronization pulses;

(c) synchronizing a frequency-hopping spread spectrum transmitter frequency-hopping hop rate and selected hop frequency dwell time to one of said analog composite video signal synchronization pulses; wherein said transmitter frequency hops are triggered by detection of said analog composite video signal synchronization pulses; and (d) modulating said analog video signal onto a carrier tuned to said first hop tuning frequency for said selected hop frequency dwell time.

9. The method for transmitting an analog composite video signal including frame synchronization pulses and line synchronization pulses with frequency-hopping spread spectrum signals of claim 8, further comprising:

(e) selecting a frequency-hopping spread spectrum transmitter second hop tuning frequency from said plurality of pre-assigned selected frequency band hop frequencies stored in a frequency-hopping spread spectrum transmitter memory; and (f) modulating said analog video signal onto a carrier tuned to said second hop tuning frequency for said selected hop frequency dwell time.

10. The method for transmitting an analog composite video signal including frame synchronization pulses and line synchronization pulses with frequency-hopping spread spectrum signals of claim 8, wherein said pre-assigned selected frequency band hop frequencies are pre-assigned ISM frequency band hop frequencies.

11. The method for transmitting an analog composite video signal including frame synchronization pulses and line synchronization pulses with frequency-hopping spread spectrum signals of claim 8, wherein said analog composite video signal including frame synchronization pulses and line synchronization pulses is an NTSC standard analog composite video signal.

12. The method for transmitting an analog composite video signal including frame synchronization pulses and line synchronization pulses with frequency-hopping spread spectrum signals of claim 11, wherein said selected hop frequency dwell time is greater than one-sixtieth of a second, thereby permitting transmission of a complete NTSC interlaced frame scan in each hop.

13. The method for transmitting an analog composite video signal including frame synchronization pulses and line synchronization pulses with frequency-hopping spread spectrum signals of claim 8, wherein said analog composite video signal including frame synchronization pulses and line synchronization pulses is a PAL standard analog composite video signal.

14. The method for transmitting an analog composite video signal including frame synchronization pulses and line synchronization pulses with frequency-hopping spread spectrum signals of claim 13, wherein said selected hop frequency dwell time is greater than one-fiftieth of a second, thereby permitting transmission of a complete PAL interlaced frame scan in each hop.

15. The method for transmitting an analog composite video signal including frame synchronization pulses and line synchronization pulses with frequency-hopping spread spectrum signals of claim 8, wherein method step (c) comprises synchronizing said transmitter hop rate and selected hop frequency dwell time to a vertical synchronization pulse; wherein said transmitter frequency hops are triggered by detection of said analog composite video signal vertical synchronization pulses.

16. A method for transmitting an analog composite video signal including periodic frame synchronization pulses and periodic line synchronization pulses using a frequency-hopping spread spectrum transmitter, comprising:

(a) sensing an analog composite video signal including frame synchronization pulses and line synchronization pulses;

(b) selecting a frequency-hopping spread spectrum transmitter first hop tuning frequency from a plurality of pre-assigned selected frequency band hop frequencies stored in a frequency-hopping spread spectrum transmitter memory;

(c) detecting a selected analog composite video signal periodic synchronization pulse and synchronizing a frequency-hopping spread spectrum transmitter frequency-hopping hop rate to said selected analog composite video signal synchronization pulses, wherein said transmitter frequency hop is triggered by detection of said selected analog composite video signal synchronization pulses; and (d) modulating said analog video signal onto a carrier tuned to said first hop tuning frequency until a subsequent selected analog composite video signal synchronization pulse is detected.

17. The method for transmitting an analog composite video signal including frame synchronization pulses and line synchronization pulses using a frequency-hopping spread spectrum transmitter of claim 16, further comprising:

(e) selecting a frequency-hopping spread spectrum transmitter second hop tuning frequency from said plurality of pre-assigned selected frequency band hop frequencies stored in a frequency-hopping spread spectrum transmitter memory; and (f) modulating said analog video signal onto a carrier tuned to said second hop tuning frequency until a subsequent selected analog composite video signal synchronization pulse is detected.

18. The method for transmitting an analog composite video signal including frame synchronization pulses and line synchronization pulses using a frequency-hopping spread spectrum transmitter of claim 16, wherein the selected analog composite video signal synchronization pulse recited in method steps (c) and (d) is a vertical synchronization pulse.

19. The method for transmitting an analog composite video signal including frame synchronization pulses and line synchronization pulses using a frequency-hopping spread spectrum transmitter of claim 16, wherein said analog composite video signal including frame synchronization pulses and line synchronization pulses is an NTSC standard analog composite video signal.

20. The method for transmitting an analog composite video signal including frame synchronization pulses and line synchronization pulses using a frequency-hopping spread spectrum transmitter of claim 16, wherein said analog composite video signal including frame synchronization pulses and line synchronization pulses is a PAL standard analog composite video signal.

21. A method for transmitting an analog composite video signal including periodic frame synchronization pulses and periodic line synchronization pulses using a frequency-hopping spread spectrum transmitter, comprising:

(a) sensing an analog composite video signal including frame synchronization pulses and line synchronization pulses;

(b) selecting a frequency-hopping spread spectrum transmitter first hop tuning frequency;

(c) modulating said analog composite video signal onto a carrier tuned to said first hop tuning frequency (d) selecting a frequency-hopping spread spectrum transmitter second hop tuning frequency; and (e) modulating said analog composite video signal onto a carrier tuned to said second hop tuning frequency.

\* \* \* \* \*